H. E. DODGE.
PISTON.
APPLICATION FILED NOV. 3, 1916.

1,218,986.

Patented Mar. 13, 1917.

INVENTOR
Horace E. Dodge
BY Newell & Neal
his ATTORNEYS

UNITED STATES PATENT OFFICE.

HORACE E. DODGE, OF GROSSE POINTE, MICHIGAN, ASSIGNOR TO DODGE BROTHERS, OF DETROIT, MICHIGAN, A CORPORATION OF MICHIGAN.

PISTON.

1,218,986.

Specification of Letters Patent.

Patented Mar. 13, 1917.

Application filed November 3, 1916. Serial No. 129,281.

*To all whom it may concern:*

Be it known that I, HORACE E. DODGE, a citizen of the United States, residing at Grosse Pointe, Michigan, have invented certain new and useful Improvements in Pistons, of which the following is a clear, full, and exact description.

This invention relates to an improved piston for use in internal combustion engines.

As the piston of an internal combustion engine is necessarily in contact with burning gas at a high temperature and is so situated that it cannot be cooled by conduction as readily as other surfaces in contact with the gas, it has been found that the head of the piston, in some cases, reaches an objectionably high temperature. This temperature may become high enough to cause pre-ignition and may also reduce the strength of the piston to a dangerous point. The heating effect referred to is aggravated by the lubricating oil striking on the inner side of the head and leaving a carbon deposit as it burns. As soon as this carbon deposit begins to form, the piston head tends to become still hotter as the carbon insulates it from the cooling effect of the air inside the piston.

The present invention comprises an improved piston, one of the objects of which is to provide a piston head which is shielded from the lubricating oil thrown about inside the piston and in which the objectionable results above mentioned are eliminated. Another object is to provide a means for collecting the oil which would ordinarily be thrown upon the inner side of the piston head and conducting it to the proper points so that it may be used for lubricating the bearing between the connecting rod and the piston pin, or the bearings between the piston and the piston pin if a construction is used in which the piston pin is fixed in the connecting rod.

These being among the objects of the present invention, the same consists of certain features of construction and combinations of parts to be hereinafter described and then claimed with reference to the accompanying drawings which illustrate a suitable embodiment of the invention having the above and other objects in view.

Figure 1:
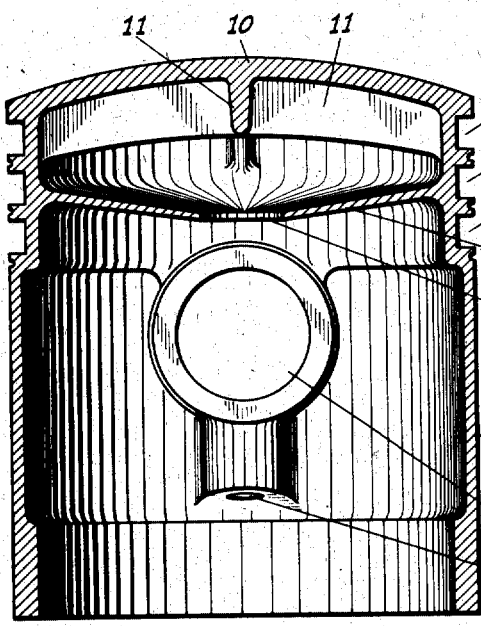
Figure 1 is a sectional elevation through the piston at right angles to the piston pin, being taken on the line A—A of Fig. 2.
Figure 2:
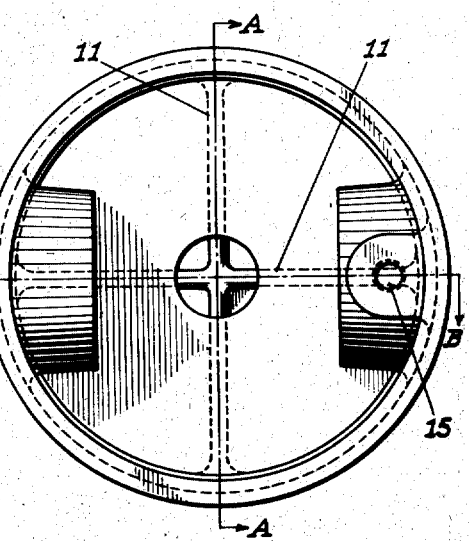
Fig. 2 is a bottom plan view of the piston.

Referring to Fig. 1, the piston head 10 is shown to have a convex surface when viewed from the outside of the piston, though it may be flat or concave, as desired, without affecting the action of the improvements to be described. The piston head 10 is also shown to be stiffened with the integral ribs 11 which, however, are not essential to the proper operation of the present invention. The side walls of the piston 12 are shown with the usual ring grooves 13 which may be arranged as desired. The piston is fitted with holes 14 and a tapped hole 15 for a set screw which holds the piston pin rigid in the piston. However, as above mentioned, the piston pin may be fixed in the connecting rod and allowed to oscillate in the piston if this construction is preferred.

In addition to the above mentioned features, which are well known, the piston of the present invention is provided with a diaphragm or baffle plate 16, located in the space between the piston head and the bosses for the piston pin. This diaphragm serves to prevent oil from being thrown upon the piston head and, as it is not in contact with the hot gases inside the combustion chamber, its temperature is not sufficient to burn the oil and produce a carbon deposit. Instead, it may be so shaped as to cause the oil to flow to any desired point where it may be utilized for lubrication.

Figure 3:
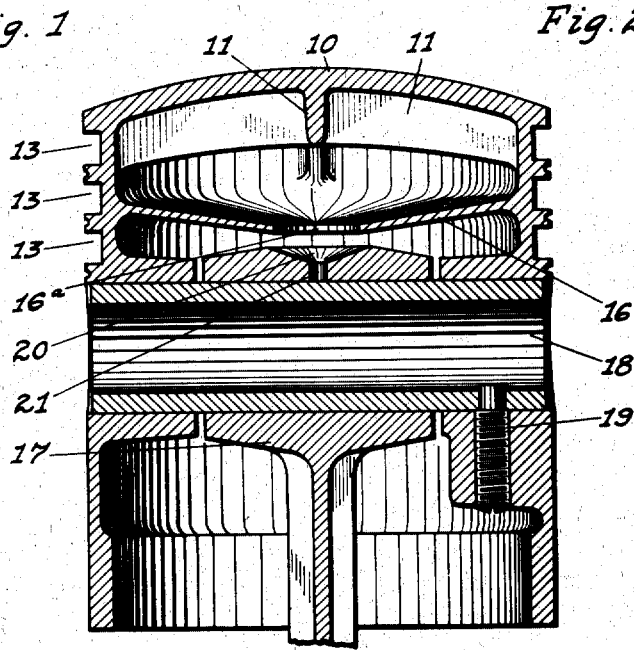
Fig. 3 is a sectional elevation through the piston taken in a plane passing through the axis of the piston pin or on the line B—B of Fig. 2, and showing also the piston pin and part of the connecting rod in section.

In the drawing, the diaphragm is shown to have a conical form so that the oil drains toward the center, where it will fall from the diaphragm upon the end of the connecting rod. By arranging a suitable pocket in the end of the rod, the oil may be conducted to the bearing surfaces between the rod and the piston pin. This arrangement is shown in Fig. 3, where 17 is the connecting rod, 18 the hollow piston pin and 19 the set screw for locking the piston pin in place. In the upper end of the connecting rod, the pocket 20 is provided to collect the oil which falls from the edge of the hole 16ª in the diaphragm. Communicating with the pocket 20, is the hole 21 which allows the oil to flow to the bearing surface between the connecting rod and the piston pin. If the pin is fixed in the rod and the bearing surfaces are between the pin and the piston, the diaphragm may be shaped to conduct the oil to points above the piston pin bosses so that it will fall in channels leading to the bearings. In the drawings, the diaphragm is shown to be cast integral with the piston and is provided with a hole 16ª at its center, this hole being for convenience in coring. The same results may, of course, be obtained by making the diaphragm in one or more pieces separate from the piston and the hole in the center may be omitted if not required by the foundry.

It is obvious that the invention is susceptible of further modification as parts may be omitted, parts added and parts substituted without departing from the spirit and scope of the invention as expressed in the claims.

What I claim as new is—

1. A piston having a head and a diaphragm within said piston, located between said head and the piston-pin holes.

2. In an internal combustion engine, a piston having a head, and a diaphragm adapted to collect oil thrown upon said diaphragm at one or more points and arranged to conduct the collected oil to the bearing surfaces in the piston.

3. A piston having a head, and a diaphragm of conical form, the taper of the cone being toward the bearing surfaces in the piston.

4. In an internal combustion engine, a piston having a head, and a diaphragm adapted to conduct oil toward the longitudinal axis of the piston at a point between the said head and the parts within and operated by said piston.

5. A piston having a head, and a diaphragm separated from said head at a distance less than that of the piston-pin holes from said head, and forming a shield for protecting said head from oil.

6. In an internal combustion engine, a piston having a head, and means for intercepting oil thrown toward said head inside of said piston, said means being located between said head and the piston-pin holes.

7. In an internal combustion engine, a piston having a head, and means for intercepting oil thrown toward said head inside of said piston, said means also acting to collect oil at pre-determined points and deliver it within said piston.

8. A piston having a head, and means positioned coöperatively adjacent said head for preventing the carbonization of oil on the inner surface of said head.

9. In an internal combustion engine, a piston having a head, and means within said piston and positioned in juxtaposition to but out of contact with said head for cooling said head by the radiation of heat from said head.

10. In combination, a piston having a head, a connecting rod having a pivotal connection with said piston, and a diaphragm located within said piston between said head and said connecting rod.

11. In combination, a piston having a head, a connecting rod having a pivotal connection with said piston, and a diaphragm located within said piston between said head and said connecting rod, said diaphragm having a hole in substantial alinement with said connecting rod.

12. In combination, a piston having a head, a connecting rod having a pivotal connection with said piston, and a diaphragm located within said piston between said head and said connecting rod, said diaphragm being formed relatively to said connecting rod to drop oil thereonto.

Signed at Detroit, Mich., this 30th day of October, 1916.

HORACE E. DODGE.

Witnesses:
ALFRED H. KNIGHT,
ARCHIE A. McPHERSON.